United States Patent
Howard et al.

(10) Patent No.: US 11,798,100 B2
(45) Date of Patent: Oct. 24, 2023

(54) TRANSACTION COUNTERPART IDENTIFICATION

(71) Applicant: Steady Platform LLC, Atlanta, GA (US)

(72) Inventors: Tyler Howard, Atlanta, GA (US); Jason Robinson, Atlanta, GA (US); John Michael Robertson, Atlanta, GA (US); Nathan Crockett, Atlanta, GA (US); Andrew Toloff, Atlanta, GA (US); Winn Martin, Atlanta, GA (US); Marcel Crudele, Atlanta, GA (US)

(73) Assignee: Steady Platform LLC, Atlanta, GA (US)

( * ) Notice: Subject to any disclaimer, the term of this patent is extended or adjusted under 35 U.S.C. 154(b) by 121 days.

(21) Appl. No.: 17/342,622

(22) Filed: Jun. 9, 2021

(65) Prior Publication Data

US 2022/0398670 A1 Dec. 15, 2022

(51) Int. Cl.
*G06Q 40/12* (2023.01)
*G06F 16/22* (2019.01)
*G06N 3/08* (2023.01)

(52) U.S. Cl.
CPC ............. *G06Q 40/12* (2013.12); *G06F 16/22* (2019.01); *G06N 3/08* (2013.01)

(58) Field of Classification Search
None
See application file for complete search history.

(56) References Cited

U.S. PATENT DOCUMENTS

| | | | |
|---|---|---|---|
| 10,460,391 B2* | 10/2019 | Caldwell | G06Q 40/06 |
| 10,510,113 B2 | 12/2019 | Caldwell | |
| 10,621,164 B1* | 4/2020 | Kain | G16H 40/20 |
| 10,884,810 B1* | 1/2021 | Verma | H04L 67/02 |
| 10,956,925 B1* | 3/2021 | Ouyang | G06Q 30/0215 |
| 10,984,468 B1 | 4/2021 | Hockey et al. | |
| 11,062,214 B2* | 7/2021 | Jarrett | G06N 3/0427 |
| 11,410,766 B2* | 8/2022 | Schreier | G16H 30/40 |
| 11,514,513 B2* | 11/2022 | Word | G06N 20/00 |
| 2016/0140300 A1* | 5/2016 | Purdie | G16H 20/40 705/2 |
| 2018/0218446 A1* | 8/2018 | Ries | H04L 63/0853 |
| 2018/0218448 A1 | 8/2018 | Thomas et al. | |
| 2018/0350006 A1* | 12/2018 | Agrawal | G06F 7/026 |
| 2019/0066203 A1 | 2/2019 | Smith et al. | |

(Continued)

*Primary Examiner* — Fateh M Obaid
(74) *Attorney, Agent, or Firm* — Buckley, Maschoff & Talwalkar LLC

(57) ABSTRACT

Provided are systems and methods for identifying a counterpart entity of a transaction from a transaction string. In one example, a method may include identifying a transaction string from an account of a target entity, the transaction string comprising a record of a payment that changed a balance of the account, executing a machine learning model based on the transaction string to determine a counterpart entity of the transaction with respect to the target entity, wherein, during execution, the machine learning model receives the transaction string as input and outputs an identifier of the counterpart entity, generating a data structure comprising a first field that stores the transaction string and a second field that stores an identifier of the counterpart entity, and storing the data structure within a file.

20 Claims, 6 Drawing Sheets

(56) References Cited

U.S. PATENT DOCUMENTS

| | | | |
|---|---|---|---|
| 2020/0097981 A1* | 3/2020 | Teo | G06N 20/00 |
| 2020/0137080 A1* | 4/2020 | Bloomquist | G06F 21/335 |
| 2020/0302425 A1* | 9/2020 | Artemiw | G06Q 20/227 |
| 2021/0034917 A1* | 2/2021 | Thekkumpat | G06F 18/23213 |
| 2021/0125287 A1* | 4/2021 | Fasoli | G06Q 20/405 |
| 2021/0142399 A1* | 5/2021 | Joliveau | G06K 9/6223 |
| 2021/0157809 A1* | 5/2021 | Mor | G06F 16/27 |
| 2021/0182803 A1* | 6/2021 | Mintz | G06N 20/00 |
| 2021/0233162 A1 | 7/2021 | Hockey et al. | |
| 2021/0279612 A1* | 9/2021 | Jarrett | G06N 3/0427 |
| 2021/0326980 A1 | 10/2021 | Thomas et al. | |
| 2021/0374844 A1* | 12/2021 | Word | G06Q 40/02 |
| 2021/0406815 A1* | 12/2021 | Mimassi | G06Q 10/10 |
| 2022/0020083 A1* | 1/2022 | Restorff | G06N 20/00 |
| 2022/0027983 A1* | 1/2022 | Ben David | G06Q 40/025 |
| 2022/0051125 A1* | 2/2022 | Ho | G06F 18/23213 |
| 2022/0215293 A1* | 7/2022 | Jacobe | G06F 18/2178 |
| 2022/0327504 A1* | 10/2022 | Koren | G06Q 20/08 |

\* cited by examiner

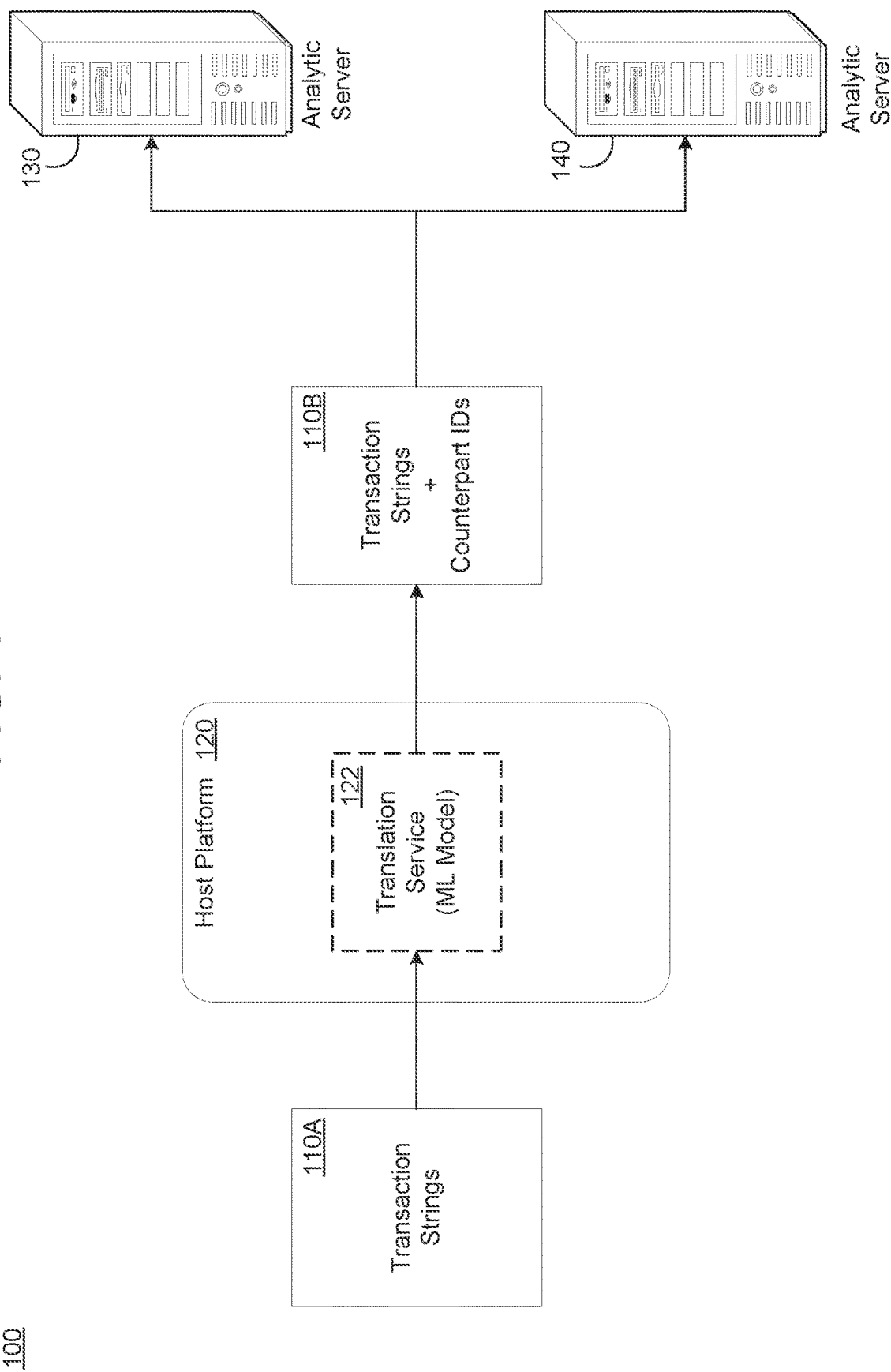

TRANSACTION COUNTERPART IDENTIFICATION

BACKGROUND

A transaction string is a collection of text that provides details about a financial transaction. Each time an account is involved in a financial transaction (e.g., deposit, payment, transfer, charge, refund, withdrawal, etc.) a transaction string may be generated by a payment processor or other entity of the payment network and stored within a transaction history record or other data record of the user of the account. Transaction strings may include helpful information about the transaction such as a date, a location, a type or purpose of the transaction, and ideally, an identifier of a counterpart entity (e.g., other account) involved in the transaction. However, not all transaction strings are the same. In many cases, the counterpart entity is not identified. In some cases, a user may be able to view the transaction string and make an educated guess at the counterpart entity based on information that is known to the user, but in some cases, the counterpart entity is not recognizable.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1 is a diagram illustrating a computing environment for transaction string translation in accordance with an example embodiment.

Figure 2A:
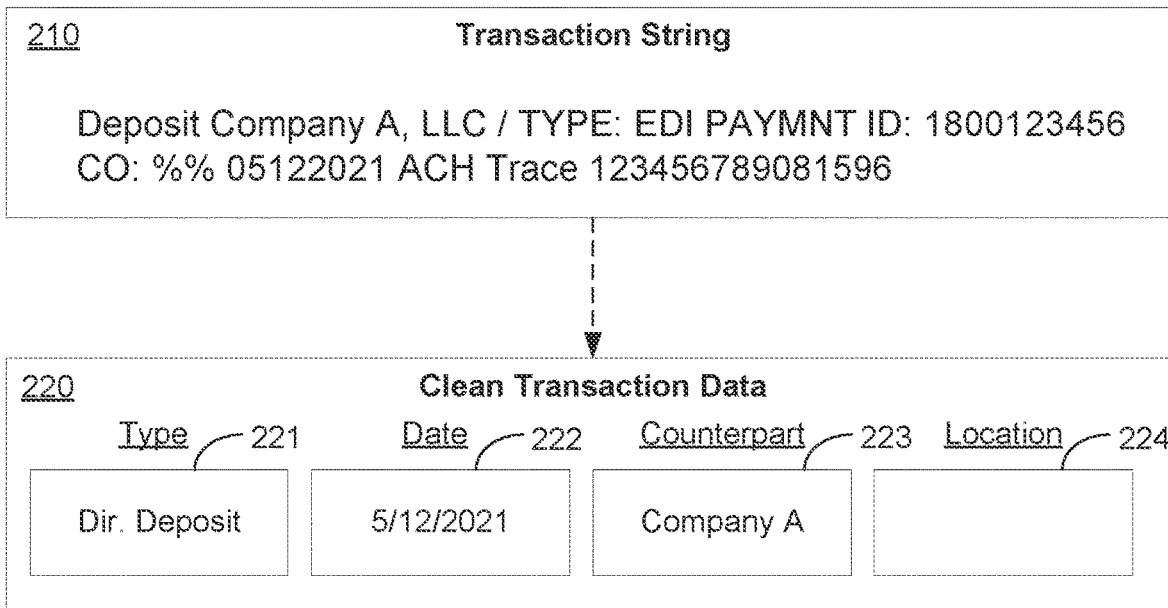
FIGS. 2A and 2B are diagrams illustrating a process of translating a transaction string into a counterpart entity in accordance with example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but is to be accorded the widest scope consistent with the principles and features disclosed herein.

The example embodiments are directed to a platform that can identify a counterpart entity of a transaction from content included in a transaction string of the transaction. A transaction string may be provided by a financial institution within a transaction history of a financial account. The financial account may be an account that is issued by the financial institution to an entity such as a person or an organization. A transaction string typically provides information about the transaction that benefits the account holder. For example, the transaction string may include a date value, a location value, a time value, a payment type value, and the like. In some cases, the transaction string includes an identifier of the other entity of the transaction (referred to herein as a counterpart entity). However, in many cases, the counterpart entity is not listed in the transaction string.

According to various embodiments, the platform may include a translation service capable of mapping a transaction string, or one or more sub-strings within the transaction string, to a counterpart entity. In some embodiments, the translation service may include a machine learning model or multiple machine learning models that perform the translation. Here, the host platform may also train the machine learning model based on historical mappings between transaction strings and counterpart entities that are manually mapped or automatically mapped by the machine learning model in previous iterations. In some embodiments, the translation service may be part of a larger translation cleaning process which not only identifies the counterpart entity but creates a structured data entry which includes various data values from the transaction string such as a date, a transaction type, a counterpart entity, and the like.

The trained model can be used to process data records stored within a database, for example, a topic stream of a KAFKA® database, or the like. The trained model may receive a data structure such as a document, spreadsheet, table, etc., that includes information from a plurality of financial transactions. For example, each entry in the data structure may include a value for a transaction string and value for a transaction identifier of a respective financial transaction. The translation service described herein can receive the data structure, and determine counterpart entity values for each of the transactions strings based on a machine learning model. Furthermore, the translation service may modify the data structure to include a new value in a field of the data structure designed for the counterpart entity. The resulting data structure may be used as an input into one or more additional machine learning models, such as in a cascading or ensemble arrangement of machine learning models.

Accordingly, the translation service described herein may translate transaction strings which often include confusing, complicated, and esoteric text used to describe transactions into a data value that is more easily understood by human observers and add semantic meaning that can allow more advanced transaction analysis across collections of users and transactions.

In the example embodiments, financial institutions (FI's) refer to organizations that engage in financial and monetary transactions such as deposits, loans, investments, and currency exchange for both individuals and business. They include, but are not limited to retail and commercial banks, Internet banks (or neo-banks), credit unions, savings and loan associations, investment banks and companies, trust companies, insurance companies, brokerage firms, mortgage companies, electronic commerce companies, and the like.

Financial institutions offer a variety of financial accounts including, but not limited to checking accounts, savings accounts, money market accounts, certificates of deposits, home equity loans, auto loans, personal loans, credit cards, prepaid debit cards, payroll cards, and the like.

Financial accounts have a balance that is affected by credits and debits. Each financial record is referred to as a transaction with examples including, but not limited to deposits, interest, refunds, fees/penalties, withdrawals, transfers, charges, and the like. Transactions are not only found in financial accounts. Other examples include, but are not limited to, payments to workers from companies such as payroll processors, employer human resource systems, and the like.

Furthermore, a transactions consist of several pieces of data, and can include the date of the transaction, the amount of the transaction, whether it was positive or negative, and the transaction string. The transaction string is a collection of text that provides additional detail about the transaction and might include additional date information, location information, type or purpose of the transaction, and ideally a description of the other entity involved in the transaction, apart from the owner of the financial account. In this case, the transaction string may be taken from a bank statement or transaction history of the financial account and may include a deposit from another entity, a payment another entity, or the like. In the example embodiments, the other entity on the opposite side of the transaction is referred to herein as the counterpart entity.

For example, transaction strings represent a description of a transaction between an entity (target entity) of a financial account and a counterpart entity that is on the other side of the transaction from the target entity. Examples of a counterpart entity include, but are not limited to an employer in a payment from the Employer to an employee where the employee is the target entity, a merchant when a consumer purchases services or goods from the merchant and the consumer is the target entity, another person when there is payment to or from a target person to or from the other person, and a target entity themselves when a person moves funds between their own accounts or makes a cash deposit into their account. In other words, when examining a transaction from a specific source such as a bank statement or a transaction history, that record belongs to a target entity of the source. The entity on the other side of the transaction is the counterpart entity.

In the example embodiments, a host platform executing a translation software may perform a "transaction string cleaning process" that analyzes the transaction string and identifies the counterpart entity based off of the content within the transaction string. Furthermore, the translation software may extract metadata about a transaction and build or otherwise modify a data structure storing the transaction information to include the extracted metadata. The metadata may include an identification of the counterpart entity through transaction string analysis. Other possible metadata could include additional date information, location information, and type or purpose of the transaction. The data structure may include a table, a stream, a file, a document, a spreadsheet, and/or the like. In some embodiments, the data structure is a row and column based array of data.

While it would be ideal for transaction strings to clearly identify the counterpart entity involved in a transaction, this is frequently not the case. In some cases, it may be possible for a human observer to identify the counterpart entity from a transaction string such as a charge from a retail store that might appear similar to "Company A Store #123 00000433DECATUR GA". However, in many cases, the name of the Company is not made explicit in the transaction string.

For example, an employee may be employed by an employer named "Company." Ideally the transaction string would include the name of the employer (i.e., Company) in the deposit transaction string as the counterpart entity. However, in many instances, the company name is not present. In this scenario, a human observer of the financial account where the transaction string is present may be able to identify the counterpart entity for the transaction based on the date and amount or possibly because they can recognize a name of a payroll provider included in the transaction string. However, such observances are limited.

Adding to this complexity is that transaction strings involving the same counterpart entity can vary by financial institution, financial account, or even within the same financial account. Below are a few examples of what transaction strings can look like from a single counterpart entity with a fictitious name "Gig Company."

TABLE 1

| Transaction ID | String Value |
| --- | --- |
| 0001 | "Direct Deposit RIZER, LLC EDI PAYMNT" |
| 0002 | "Deposit RAISER, LLC/TYPE: EDI PAYMNT ID: 1800123456 CO: RIZER, LLC %% ACH Trace 123456789081596" |
| 0003 | "MONEY TRANSFER AUTHORIZED ON November 2011 FROM GigCompany GigCompany CA P00000000934260369 CARD 9876" |
| 0004 | "MONEY TRANSFER AUTHORIZED ON January 2007 FROM Green Dot Corporation CA S00580008230434303 CARD 9876" |
| 0005 | "MONEY TRANSFER AUTHORIZED ON January 2011 FROM Smith John NY S98765432198765432 CARD 9876" |

In Table 1, only the third transaction string (Transaction ID 0003) includes an identifier of the counterpart entity, "Gig Company," whereas the remaining transaction strings do not include such a value.

The translation service described herein can automate the identification of the counterpart entity from the transaction strings in Table 1 above, including the four transaction strings where the counterpart entity is not expressly listed. That is, the translation service described herein provides a method of translating transaction strings through automation, and in some cases, automation informed by manual cleaning of individual or bulk transaction string cleaning. The cleaning process may be used to extract specific data values from the transaction string (e.g., dates, transaction types, locations, counterpart entities, etc.) while removing or otherwise obscuring the other data within the transaction string.

Some of the benefits provided herein include automated "cleaning" of transaction strings to identify counterpart entities associated with transactions and to extract data values from the transaction that are more relevant to a financial account owner. In addition, the cleaning process can be applied across large collections of transactions associated with various counterpart entities, financial institutions, financial accounts, and financial account owners and storing such data within a data structure such as a table, a spreadsheet, a document (e.g., CSV, XML, etc.), and the like, which can be input to another machine learning model for additional analytics using both the transaction data and the counterpart entity information. This network effect enables robust analytics of income and expenses across a community of financial account owners in order to extract composite metrics.

In some embodiments, the translation service may give semantic meaning to counterpart entity identification for transaction strings through a multi-tiered analysis of unstructured—or unknown structure—text analysis. In addition to performing machine learning to identify the counterpart entity, the service may also perform multi-source enrichment which includes the use of multiple data sources that have overlapping information on the same collection of transactions to give more additional data to the model. In addition, the translation service may receive end-user transaction string cleaning (i.e., a user that manually identifies a counterpart entity within a transaction string) and input these manual identifications into the machine learning model during training. Furthermore, the translation service may have predefined rules that perform pattern and sub-string matching.

By allowing users to specify counterpart entities for individual or collections of transactions creates mappings that can be applied across that users' transactions and also mappings for training the machine learning model. Simplistically, if a user specifies that "Gig Company" is the counterpart entity for transaction strings that match Direct Deposit Payment Process A, EDI PAYMNT, Gig Company can be displayed as the counterpart entity each time a similar transaction is present. Similarly, if that same user specifies other, different transaction strings are also associated with "Gig Company," not only can the appropriate counterpart entity be displayed to the user for relevant transactions, but analysis of all transactions that have the same counterpart entity can be performed regardless of the underlying transaction strings. If the same mappings are provided by a statistically significant number of users/financial accounts across a statistically significant number of transactions, the mapping rule could be extended across all transactions so that the counterpart entity is mapped even to transactions that were not part of manual translation data set. While allowing individuals to clean their own transactions is of significant value, these manual mappings may be used to extend automated transaction string cleaning capabilities across transactions, financial accounts, and users by improving/continually retraining the machine learning model based thereon.

Whereas the previous examples involve a mapping of the complete text of a transaction string to a counterpart entity, it is also possible to create rules for substrings of a transaction string that map to a counterpart entity. Here, the sub-string may include a word or value that is embedded within the transaction string, but not the entire transaction string. As an example, a rule may be setup that declares if a transaction string contains the term "Payment Processor A" or the term "GigCompany", then the counterpart entity is "Gig Company." These mapping rules could be generated by individual users, experts tasked with defining such rules, or as the output of machine learning algorithms designed to recognize such patterns. Examples of this type of matching include, but are not limited to, REGEX (Regular Expression or Rational Expression) and NER (Named-Entity Recognition).

While establishing a collection of mapping rules manually is of significant value, the mappings and the rules that are generated can be used to train a machine learning model to automate the generation and maintenance of mapping rules for transaction string cleaning (counterpart entity identification) as further described in the examples below.

It is also possible to identify counterpart entities by associating transactions from multiple sources through reconciliation. One way is by combining data sets from payroll processors and employers and comparing them to deposits in financial accounts. For example, if it is known that an employer—"Gig Company"—paid a worker $300 on Jan. 11, 2021 and there is a deposit transaction for that worker on that date for the same amount, the transaction string for the deposit in the financial account can be associated with the counterpart entity "Gig Company," regardless of the content of that transaction string. That is, the additional data around the transaction can be used to identify a counterpart entity.

For example, a transaction string "MONEY TRANSFER AUTHORIZED ON 01/11 FROM Smith John NY 598765432198765432 CARD 9876" may be input to the machine learning model. Here, the machine learning model may identify a mapping rule between the content of the transaction string and a counterpart entity or additional content associated with the transaction string and a counterpart entity. For example, a mapping may include transaction strings that contain 598765432198765432 have "Gig Company" as the counterpart entity. As another example, a mapping rule may identify that transaction strings that follow this pattern, but does not necessarily have "01/11", "Smith John", "S98765432198765432", or "9876" have "Gig Company" as the counterpart entity. In this case, the machine learning model may map a transaction string to a counterpart entity (that is often hidden within the transaction string) that does not rely on human translation thus saving significant time.

FIG. 1 illustrates a computing environment 100 for transaction string translation in accordance with an example embodiment. Referring to FIG. 1, the computing environment 100 may include a plurality of computing devices that are connected to each other via a network such as the Internet. Here, a host platform 120 may host a translation service 122 that is capable of identifying counterpart entities within transaction strings 110A to create "cleaned" transaction strings 110B which include an identifier of the transaction and an identifier of the counterpart entity. In some embodiments, the cleaned transaction strings 110B may include additional data such as values that are extracted from the transaction string including date, location, payment type, and the like.

According to various embodiments, the translation service 122 may include manually mapped strings to counterpart entities. The translation service 122 may also include a rules engine with rules for matching transaction strings to counterpart entities. In addition, the translation service 122 may include one or more machine learning models therein that are capable of predicting a mapping between a transaction string and a counterpart entity. Here, the machine learning models may be trained by the host platform 120 based on historical mappings between transaction strings and counterpart entities. Here, the historical mappings may be those created by users, those created by rules, and those created by previous iterations of the machine learning models.

The resulting transaction strings 110B with the counterpart entity information embedded therein can be forwarded to additional computing devices, for example, one or more of analytic servers 130 and 140 for additional processing. As another example, the additional analytics may be performed on the host platform 120. In any case, the analytics can include an additional machine learning operation on the transaction strings 110B including both the transaction string data and the newly identified counterpart identity data. Thus, a chain of machine learning models may be executed including a first machine learning model for identifying the counterpart entity and a second machine learning model for performing additional processing on the transaction string and the newly identified counterpart entity. In this case, an output from the first machine learning model may be input to the second machine learning model.

Figure 2B:
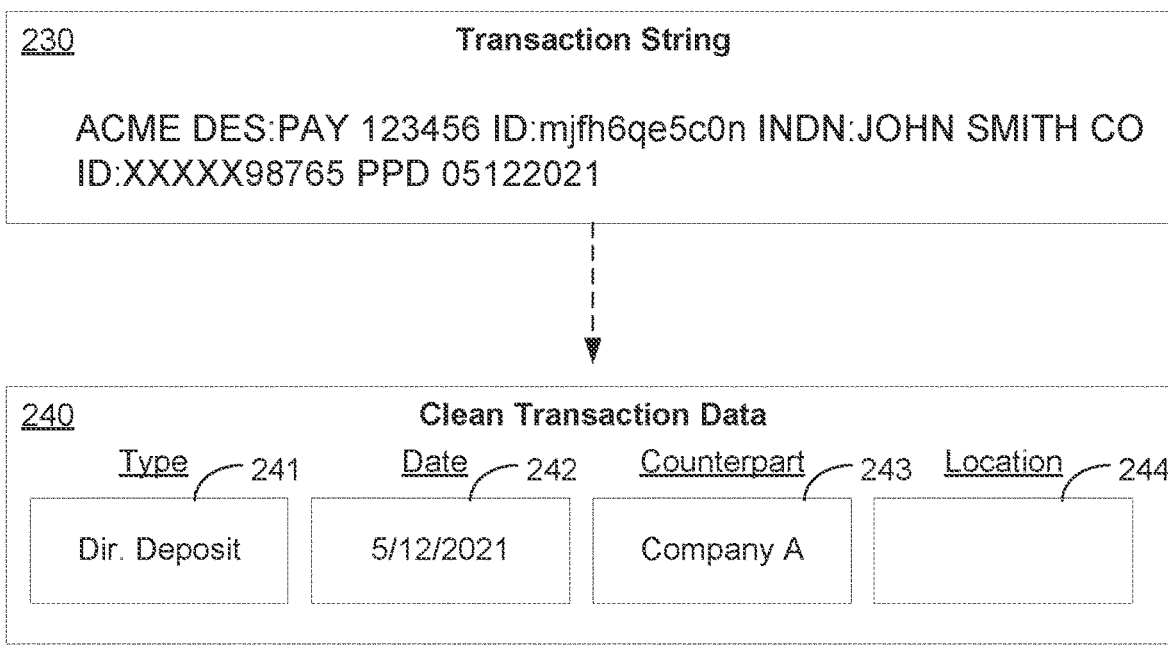

FIGS. 2A and 2B illustrate processes 200A and 200B of translating a transaction string into a counterpart entity in accordance with example embodiments. Referring to FIG. 2A, a transaction string 210 may be input to the translation service (e.g., the translation service 122 shown in FIG. 1), and the output may be the cleaned transaction data 220. The resulting cleaned transaction data 220 may include a plurality of fields 221, 222, 223, and 224 for storing data values that are identified and/or inferred from the transaction string 210. Here, the translation service may identify the counterpart entity is "Company A" who's name is explicitly recited within a transaction string 210. In addition, the translation service may identify additional details such as a type of the transaction, a date of the transaction, a geographic location, or the like. However, since this is a direct deposit type of transaction, there is no geographic location. The resulting data values that are identified by the translation service may be stored within data fields 221, 222, and 223 of the cleaned transaction data 220 while the data field 224 is left blank or empty.

FIG. 2B illustrates another example of identifying the counterpart entity. Here, a transaction string 230 is input to the translation service and the clean transaction data 240 is output. The clean transaction data 240 includes a plurality of fields 241, 242, 243, and 244 for storing data values that are identified and/or inferred from the transaction string 230. Unlike the example in FIG. 2A, in the example of FIG. 2B, the counterpart entity "Company A" is not expressly listed by name within the transaction string 230. Instead, a payroll processor name (Acme) of the employer is listed within the transaction string. In this example, the machine learning model of the translation service may implicitly map one or more substrings within the transaction string 230 to the counterpart entity name (Company A). For example, the combination of substrings "Acme", "John Smith" and "8765" may be mapped to the name of "Company A" by the machine learning algorithm. The resulting data values that are identified by the translation service may be stored within the data fields 241, 242, and 243, while the data field 244 is left empty or blank since there is not geographic location of the direct deposit.

Figure 3:
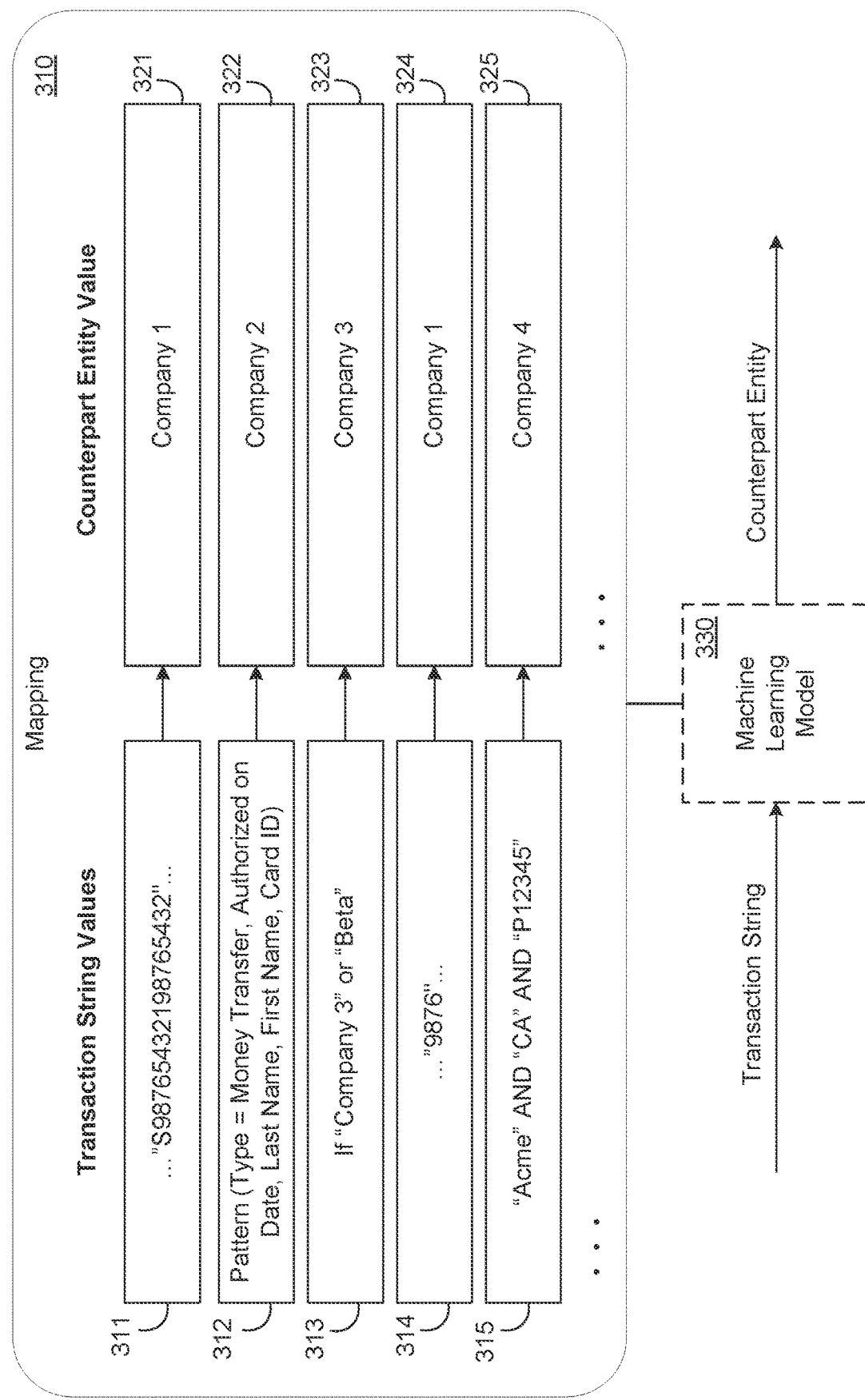
FIG. 3 is a diagram illustrating a process of mapping transaction strings to counterpart entities via a machine learning model in accordance with an example embodiment.

FIG. 3 illustrates a process 300 of mapping transaction strings to counterpart entities via a machine learning model 330 in accordance with an example embodiment. Referring to FIG. 3, a translation service (e.g., the translation service 122 in FIG. 1, etc.), may store the machine learning model 330 (or otherwise call the machine learning model 330). Here, the machine learning model 330 may learn mapping relationships between transaction strings 311-315 and corresponding counterpart entities 321-325, respectively, based on historical mappings which may be manually entered or previously mapped by the machine learning model 330.

As an example, the machine learning model 330 may be a neural network designed for the task of named entity recognition, which in this case classifies each word in a transaction string as part of a counterpart entity name, or not. The neural network may reason this by observing word placement and linguistic dependencies formed by other words in the transaction string. Accordingly, the machine learning model 330 is able to generalize over any transaction string format, as there are numerous possible formats that hard-coded rules would miss. The only data passed to the machine learning model 330 to make a prediction is the transaction string itself.

In some embodiments, the input may be the transaction string and the output may be the same data structure (e.g., document, file, table, spreadsheet, etc.) in which the transaction string is input with one or more additional values added including the identified counterpart entity and possibly other data such as date, location, payment type, and the like. In this way, the translation service may modify the input file to include a value or multiple values within a data structure thereof that makes it more helpful for processing by an addition analytics service.

Figure 4:
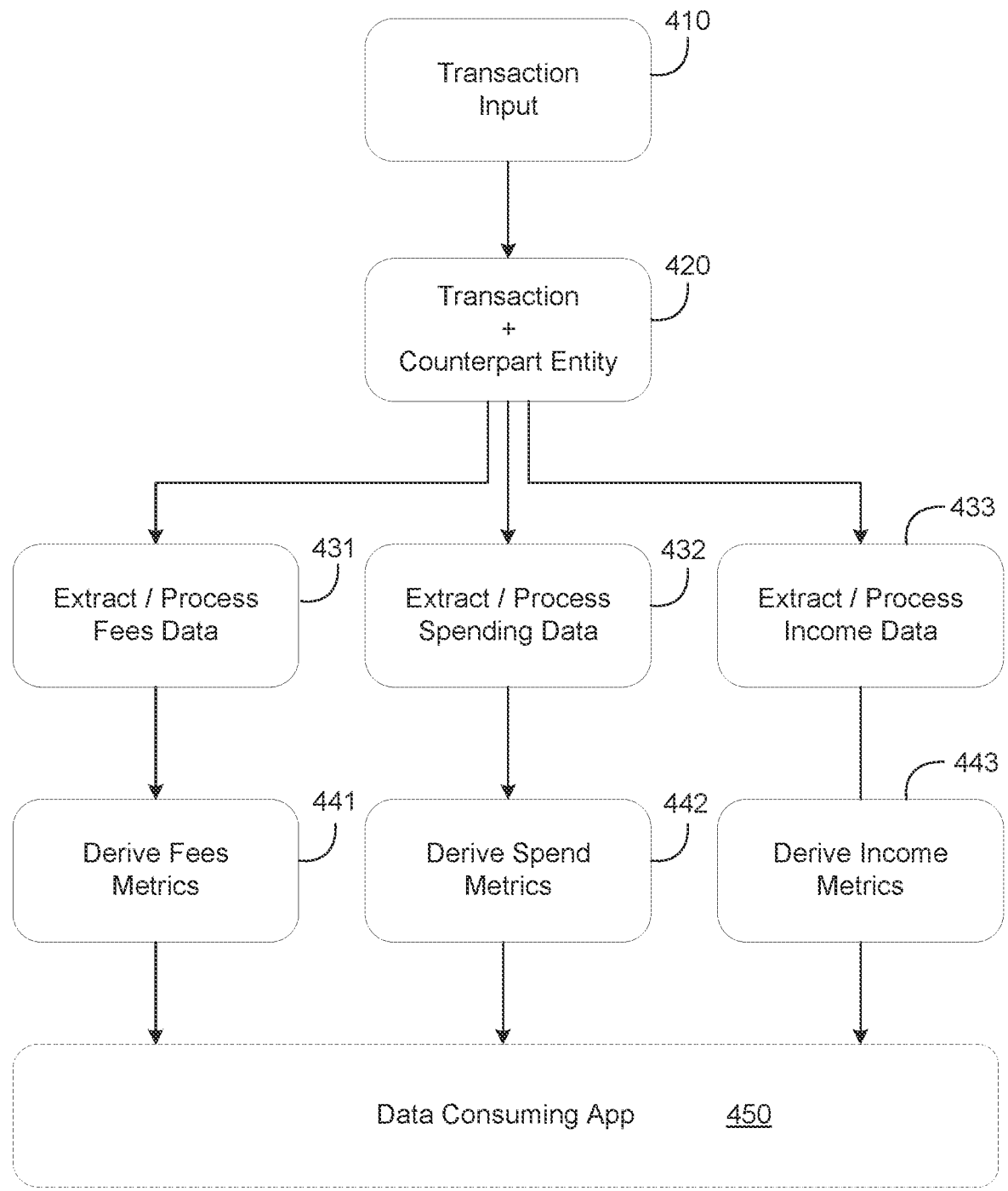
FIG. 4 is a diagram illustrating a process of performing additional analytics on translated transaction strings in accordance with an example embodiment.

FIG. 4 illustrates a process 400 of performing additional analytics on translated transaction strings in accordance with an example embodiment. By combining counterpart entity data, which in many cases is the employer, with a jobs database, the host platform may be able to create job recommendations at companies in the same or similar industries. That is, transaction data from a defined counterpart entity may be associated with an employer of the job listing. By identifying employers in bank transaction data, the service can aggregate income at the employer and geographic area levels to use in a number of ways. For example, the additional data may inform users of average/median incomes at companies in the same or similar industries, or in the user's geographic area. Furthermore, the service may track income and hiring trends across companies, industries, and/or geographies.

Identification of employers as well as counterpart entities that do not represent earned income also enable verification of income in aggregate or for specific employers. For example, the host platform may provide verification of income for independent contract workers using these capabilities, but this could also be used in lending, mortgage, or other financial services where verification of income is also needed. In addition, defined counterpart entities can be enhanced with metadata such as industry and required skills for such employment, which allows an additional layer of analysis.

Referring to FIG. 4, in 410 a transaction string is input into the translation service. In 420, the translation service identifies a counterpart entity from the transaction string, and possibly other data, and outputs a data entry that may include a first value for an identifier of the transaction string, a second value for the transaction string itself, a third value for the counterpart entity, and any additional values that are desired. In some instances, the first, second, and third values may be store din columns of a table or other tabular (row-column) data structure. Thus, multiple transaction strings may be cleaned and stored together within a same data structure where each of the cleaned data is stored neatly in respective columns. The resulting data structure may be an input to another machine learning model or other analysis service.

In the example embodiments, different types of analytics may be performed. In the example of FIG. 4, there are three types of analytics (e.g., fees, spending, and income) but the embodiments are not limited thereto. Here, in 431, an analytic may extract fees data from a plurality of transactions associated with a plurality of transaction strings stored in the data structure, derive metrics in 441 associated with the fees and the counterpart entity data, and output the derived metrics to a user interface or consuming application in 450. As another example, in 432, an analytic may extract spending data from a plurality of transactions associated with a plurality of transaction strings stored in the data structure, derive metrics in 442 associated with the spending and the counterpart entity data, and output the derived metrics to a user interface or the consuming application in 450. As another example, in 433, an analytic may extract income data from a plurality of transactions associated with a plurality of transaction strings stored in the data structure, derive metrics in 443 associated with the income data and the counterpart entity data, and output the derived metrics to a user interface or the consuming application in 450.

Figure 5:
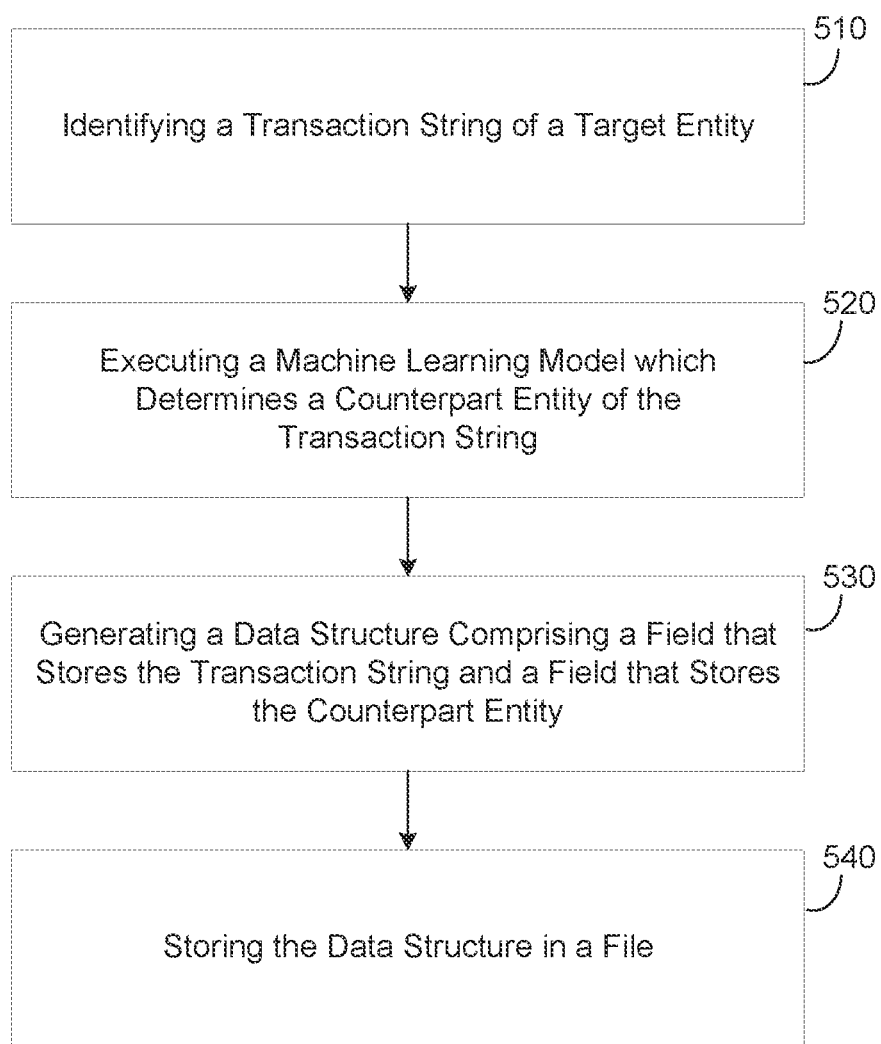
FIG. 5 is a diagram illustrating a method for identifying a counterpart entity from a transaction string in accordance with an example embodiment.

FIG. 5 illustrates a method 500 for identifying a counterpart entity from a transaction string in accordance with an example embodiment. As will be appreciated, the example of FIG. 5 is just one example of a flow, and is not limited thereto. Furthermore, one or more of the steps shown in FIG. 5 may be omitted and/or performed in a different order. Also, different steps may be included which are not shown. For example, the method 500 may be performed by a host platform receiving data from different external sources, via the Internet. The host platform may include a web server, an on-premises server, a cloud platform, a database, a computing terminal, and the like.

Referring to FIG. 5, in 510, the method may include identifying a transaction string from an account of a target entity, the transaction string comprising a record of a payment that changed a balance of the account. For example, each transaction string may be input or otherwise retrieved from a topic within a database. As another example, the transaction string may be input by a user via a user interface. As another example, the transaction string may be input within a table, document, array, spreadsheet, etc., which includes a list of transaction strings.

In 520, the method may include executing a machine learning model based on the transaction string to determine a counterpart entity of the transaction with respect to the target entity, wherein, during execution, the machine learning model receives the transaction string as input and outputs an identifier of the counterpart entity. For example, the machine learning model may be configured to imply or otherwise infer a name of a counterpart entity of the transaction string when the name of the counterpart entity is not expressly recited within the transaction string. In 530, the method may include generating a data structure comprising a first field that stores the transaction string and a second field that stores an identifier of the counterpart entity. Further in 540, the method may include storing the data structure within a file.

In some embodiments, the executing may include mapping, via the machine learning model, a combination of sub-strings within the transaction string to the identifier of the counterpart entity during execution of the machine learning model. In some embodiments, the executing may include mapping, via the machine learning model, a format of the transaction string to the identifier of the counterpart entity during execution of the machine learning model. In some embodiments, the executing may include mapping, via the machine learning model, an entirety of the transaction string to the identifier of the counterpart entity during execution of the machine learning model. In some embodiments, the generating may include inserting the transaction string into a first column of the data structure and inserting the counterpart entity into a second column of the data structure.

In some embodiments, the method may further include executing a second machine learning model on the first and second columns of the data structure including the transaction string and the identifier of the counterpart entity, respectively, and outputting a predictive result based thereon. In some embodiments, the machine learning model may include a neural network that performs named entity recognition which classifies string values to a name of a counterpart entity. In some embodiments, the method may further include retraining the machine learning model based on a mapping of the transaction string to the identified counterpart entity.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
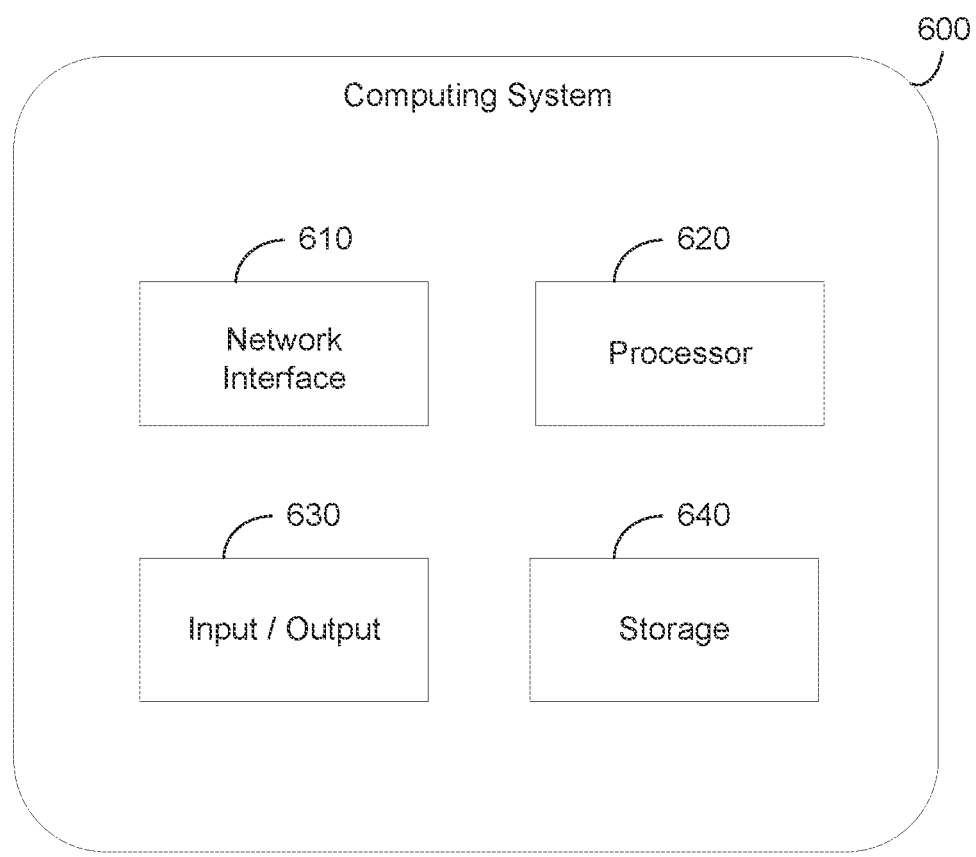
FIG. 6 is a diagram illustrating a computing system for use in the example embodiments described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 6 illustrates an example computing system 600 which may represent or be integrated in any of the above-described components, etc. FIG. 6 is not intended to suggest any limitation as to the scope of use or functionality of embodiments described herein. The computing system 600 is capable of being implemented and/or performing any of the functionality set forth hereinabove.

The computing system 600 may include a computer system/server, which is operational with numerous other general purpose or special purpose computing system environments or configurations. Examples of well-known computing systems, environments, and/or configurations that may be suitable for use as computing system 600 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 600 may be a tokenization platform, server, CPU, or the like.

The computing system 600 may be described in the general context of computer system-executable instructions, such as program modules, being executed by a computer system. Generally, program modules may include routines, programs, objects, components, logic, data structures, and so on that perform particular tasks or implement particular abstract data types. The computing system 600 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 6, the computing system 600 is shown in the form of a general-purpose computing device. The components of computing system 600 may include, but are not limited to, a network interface 610, one or more processors or processing units 620, an output 630 which may include a port, an interface, etc., or other hardware, for outputting a data signal to another device such as a display, a printer, etc., and a storage device 640 which may include a system memory, or the like. Although not shown, the computing system 600 may also include a system bus that couples various system components including system memory to the processor 620.

The storage 640 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 640 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 640 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 600 may also communicate with one or more external devices such as a keyboard, a pointing device, a display, etc.; one or more devices that enable a user to interact with computer system/server; and/or any devices (e.g., network card, modem, etc.) that enable computing system 600 to communicate with one or more other computing devices. Such communication can occur via I/O interfaces. Still yet, computing system 600 can communicate with one or more networks such as a local area network (LAN), a general wide area network (WAN), and/or a public network (e.g., the Internet) via network interface 610. As depicted, network interface 610 may also include a network adapter that communicates with the other components of computing system 600 via a bus. Although not shown, other hardware and/or software components could be used in conjunction with the computing system 600. Examples include, but are not limited to: microcode, device drivers, redundant processing units, external disk drive arrays, RAID systems, tape drives, and data archival storage systems, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a memory; and
a processor configured to
train a machine learning model to identify counterpart entities based on historical mappings between transaction strings and sub-strings corresponding to names of the counterpart entities,
identify a transaction string from an account of a target entity, the transaction string comprising a record of a transaction that changed a balance of the account of the target entity without necessarily identifying a counterpart entity of the target entity of the transaction, wherein the counterpart entity is an owner of an account on an opposite side of the transaction with respect to the target entity, execute a machine learning model on the identified transaction string to determine a name of the counterpart entity of the transaction, wherein the machine learning model maps one or more words in the transaction string to the name of the counterpart entity based on learned relationships included in the historical mappings between the transaction strings and sub-strings corresponding to the names of the counterpart entities, generate a data structure comprising a first field that stores the transaction string and a second field that stores the name of the counterpart entity, and store the data structure within a file.

2. The computing system of claim 1, wherein the processor is configured to map, via the machine learning model, a combination of sub-strings within the transaction string to the name of the counterpart entity during execution of the machine learning model.

3. The computing system of claim 1, wherein the processor is configured to map, via the machine learning model, a format of the transaction string to the name of the counterpart entity during execution of the machine learning model.

4. The computing system of claim 1, wherein the processor is configured to map, via the machine learning model, an entirety of the transaction string to the name of the counterpart entity during execution of the machine learning model.

5. The computing system of claim 1, wherein the processor is configured to insert the transaction string into a first column of the data structure and insert the name of the counterpart entity into a second column of the data structure.

6. The computing system of claim 5, wherein the processor is further configured to execute a second machine learning model on the first and second columns of the data structure, including the transaction string and the name of the counterpart entity, respectively, and output a predictive result based thereon.

7. The computing system of claim 1, wherein the machine learning model comprises a neural network that performs named entity recognition which classifies string values into the name of the counterpart entity.

8. The computing system of claim 1, wherein the processor is further configured to retrain the machine learning model based on a mapping of the transaction string to the name of the counterpart entity.

9. A method comprising:

training a machine learning model to identify counterpart entities based on historical mappings between transaction strings and sub-strings corresponding to names of the counterpart entities;

identifying a transaction string from an account of a target entity, the transaction string comprising a record of a transaction that changed a balance of the account of the target entity without necessarily identifying a counterpart entity of the transaction, wherein the counterpart entity is an owner of an account on an opposite side of the transaction with respect to the target entity;

executing a machine learning model on the identified transaction string to determine a name of the counterpart entity of the transaction, wherein the machine learning model maps one or more words in the transaction string to the name of the counterpart entity based on learned relationships included in the historical mappings between the transaction strings and sub-strings corresponding to the names of the counterpart entities;

generating a data structure comprising a first field that stores the transaction string and a second field that stores the name of the counterpart entity; and storing the data structure within a file.

10. The method of claim 9, wherein the executing comprises mapping, via the machine learning model, a combination of sub-strings within the transaction string to the name of the counterpart entity during execution of the machine learning model.

11. The method of claim 9, wherein the executing comprises mapping, via the machine learning model, a format of the transaction string to the name of the counterpart entity during execution of the machine learning model.

12. The method of claim 9, wherein the executing comprises mapping, via the machine learning model, an entirety of the transaction string to the name of the counterpart entity during execution of the machine learning model.

13. The method of claim 9, wherein the generating comprises inserting the transaction string into a first column of the data structure and inserting the name of the counterpart entity into a second column of the data structure.

14. The method of claim 13, wherein the method further comprises executing a second machine learning model on the first and second columns of the data structure including the transaction string and the name of the counterpart entity, respectively, and outputting a predictive result based thereon.

15. The method of claim 9, wherein the machine learning model comprises a neural network that performs named entity recognition which classifies string values into the name of the counterpart entity.

16. The method of claim 9, wherein the method further comprises retraining the machine learning model based on a mapping of the transaction string to the name of the counterpart entity.

17. A non-transitory computer-readable medium comprising instructions which when executed by a processor cause a computer to perform a method comprising:

training a machine learning model to identify counterpart entities based on historical mappings between transaction strings and sub-strings corresponding to the names of the counterpart entities;

identifying a transaction string from an account of a target entity, the transaction string comprising a record of a transaction that changed a balance of the account of the target entity without necessarily identifying a counterpart entity of the transaction, wherein the counterpart entity is an owner of an account on an opposite side of the transaction with respect to the target entity;

executing a machine learning model on the identified transaction string to determine a name of the counterpart entity of the transaction, wherein the machine learning model maps one or more words in the transaction string to the name of the counterpart entity based on learned relationships included in the historical mappings between the transaction strings and sub-strings corresponding to the names of the counterpart entities;

generating a data structure comprising a first field that stores the transaction string and a second field that stores the name of the counterpart entity; and storing the data structure within a file.

18. The non-transitory computer-readable medium of claim 17, wherein the executing comprises mapping, via the machine learning model, a combination of sub-strings within the transaction string to the name of the counterpart entity during execution of the machine learning model.

19. The non-transitory computer-readable medium of claim 17, wherein the executing comprises mapping, via the machine learning model, a format of the transaction string to the name of the counterpart entity during execution of the machine learning model.

20. The non-transitory computer-readable medium of claim 17, wherein the executing comprises mapping, via the machine learning model, an entirety of the transaction string to the name of the counterpart entity during execution of the machine learning model.

* * * * *